R. H. STEVENSON.
VEHICLE WHEEL.
APPLICATION FILED JUNE 23, 1911.
1,051,774.
Patented Jan. 28, 1913.
2 SHEETS—SHEET 1.
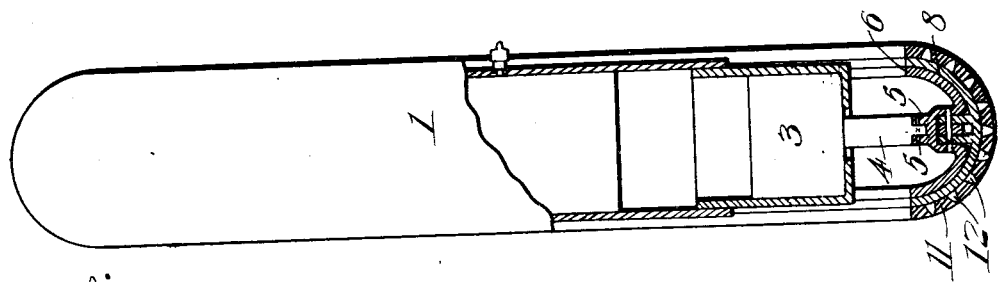
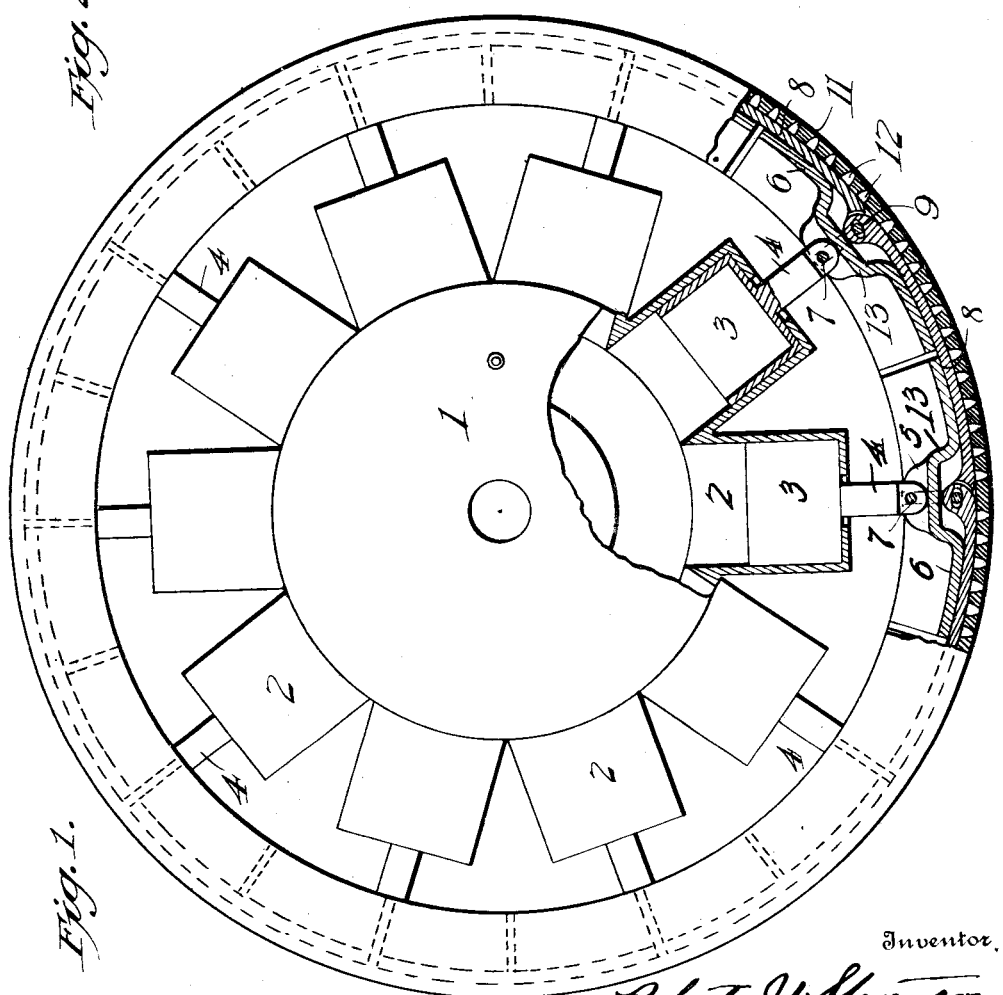
Inventor,
Robert H Stevenson,
By Jas. L. Skidmore
his Attorney,
Witnesses
M. M. Plyer.

R. H. STEVENSON.
VEHICLE WHEEL.
APPLICATION FILED JUNE 23, 1911.
1,051,774.
Patented Jan. 28, 1913.
2 SHEETS—SHEET 2.
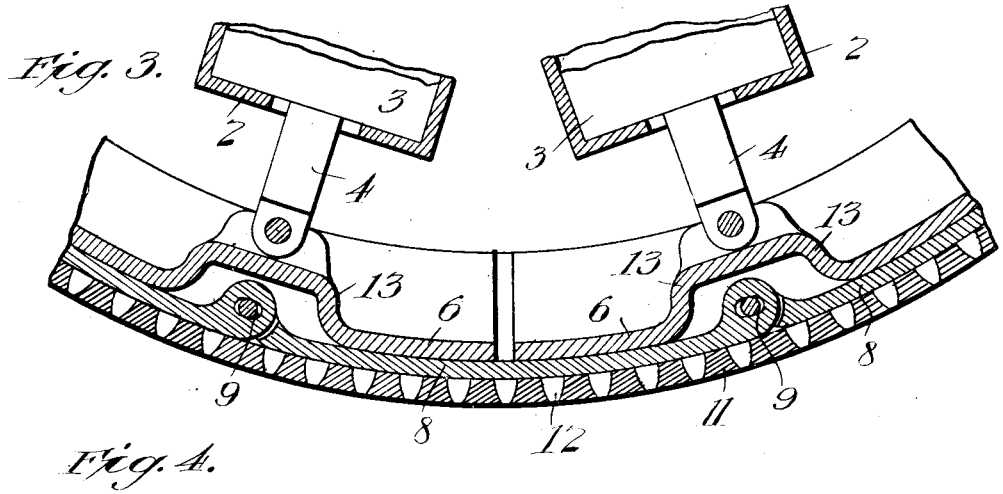
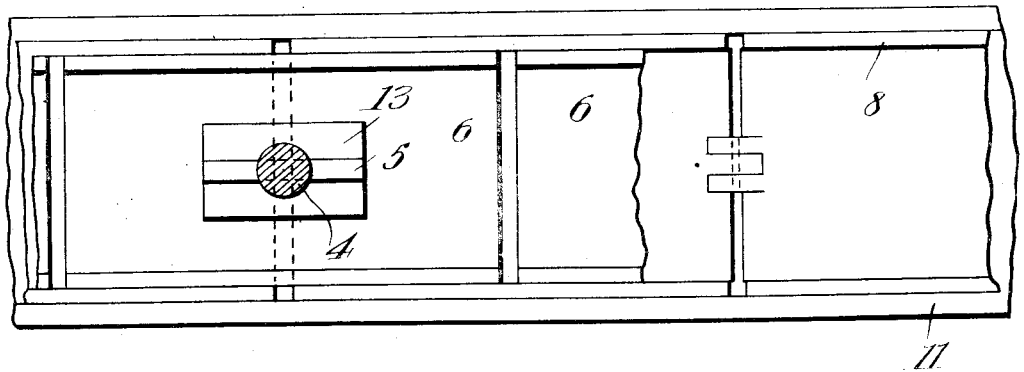
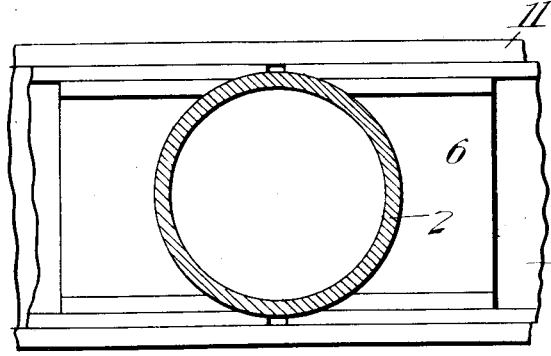
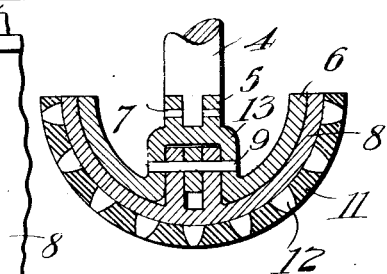
Witnesses
Inventor
Robert H. Stevenson
By Jas. L. Skidmore
His Attorney.

UNITED STATES PATENT OFFICE.

ROBERT H. STEVENSON, OF MUSKEGON, MICHIGAN.

VEHICLE-WHEEL.

1,051,774.

Specification of Letters Patent. Patented Jan. 28, 1913.

Application filed June 23, 1911. Serial No. 634,991.

*To all whom it may concern:*

Be it known that I, ROBERT H. STEVENSON, a citizen of the United States, residing at Muskegon, in the county of Muskegon and State of Michigan, have invented certain new and useful Improvements in Vehicle-Wheels, of which the following is a specification.

My invention relates to an improvement in wheels for vehicles of various kinds.

The prime object of my invention is to provide a simple, efficient, economical, and durable wheel, whereby effective and cushioning action is accomplished when the vehicle is traveling over uneven roads, and also when the vehicle is subjected to load pressure.

A further object is to provide a wheel possessing an inner rim and an outer tread, each made in a series of sections, and with broken joints, whereby the proper and practical resiliency is procured and maintained.

Another object is to furnish a wheel whereby air pressure is utilized to effect the cushioning action when said wheel is subjected to load pressure, and which will be sufficiently resilient to permit of the separate action of each cup shaped plunger, or spoke, to effect the proper cushioning action for the purpose.

The foregoing and such other objects, as may occur from the following description, are accomplished by the construction hereinafter more particularly described, illustrated by the accompanying drawings, forming a part of this specification, and particularly pointed out in the claims appended hereto.

In the accompanying drawings: Figure 1, illustrates a side view of the vehicle wheel embodying my invention, shown partly in section. Fig. 2, is a transverse view, partly in section, of the view shown in Fig. 1. Fig. 3, is a fragmentary vertical section on an enlarged scale of my improvement. Fig. 4, is a plan view of the inner rim sections and outer sections of the wheel broken away, showing a section of one of the piston arms or rods. Fig. 5, is a detail view showing one of the plungers in transverse section, and Fig. 6 represents a transverse section of the wheel rim.

The reference numeral 1, designates a hollow hub constituting a pneumatic chamber, and surrounded by a series of radially-disposed cylinders. Within each of the cylinders 2 is a cup-shaped plunger 3, provided with a projecting arm or piston rod 4 which constitutes a spoke pivotally connected between ears 5, extending centrally from each of the inner metallic rim sections 6, by means of pins 7. The rim comprises an outer section consisting of hinged metallic members 8, arranged to break joints with the inner rim sections and it will be seen that at the hinged point I provide an elongated opening, for the purpose of permitting two of the plungers to simultaneously move toward a common center. The pivotal connections 9, of the outer rim sections 8 are elongated, to permit a peripheral movement.

The numeral 11 designates a tire of leather or other fibrous material formed with a series of perforations to receive projections 12, extending from the outer metallic rim sections 8. The rim sections 6, are each provided with an upraised central portion 13, adapted to extend over the elongated pivotal joints of the outer rim sections.

The utility and advantages of the improvement will be apparent. The cushioning action of the pneumatic plungers is obvious, and the essential features of the tire, in connection with the peripheral movement of the inner rim sections, is evident.

It will be perceived that each inner rim section is provided with a central recessed portion, and the hinged sections comprising the outer rim, are secured to each of said inner rim sections by suitable means within said central recessed portions of the inner rim section.

As clearly shown in the drawings, it will be seen that each section constituting the outer rim is provided at one end with two upwardly projecting ears, and at the other end with an upwardly extended portion, both of said end portions resting within the centrally recessed portion of each inner rim section 6, and being pivotally secured by pins 9, which pass transversely through each of the outer and inner rim sections.

Having described my invention, what I desire to claim and secure by Letters Patent is:—

1. A vehicle wheel comprising, a pneumatic hub, radially disposed tubes connected with said hub, each tube having within the same a cup-shaped plunger, a series of inner rim sections, each inner section having a central recessed portion, and a series of hinged outer rim sections covering the joints of the inner section, each portion being pivotally secured to inwardly projecting members formed on said central recessed portion, and each outer section secured to each inner section within the recessed central portion of each inner section.

2. A vehicle wheel comprising, a pneumatic hub, a series of radially disposed cylinders integral with said hub, each cylinder having within the same a cup-shaped plunger, a series of inner rim sections, each inner section having a central recessed portion, and a series of outer rim sections covering the joints of the inner sections, each outer section having an elongated pivotal connection within the recessed portion of each inner section, and each plunger being pivotally secured to inwardly projecting members formed on the outside of said central recessed portion, and each outer section being secured to each inner section within the recessed central portion of each inner section.

3. A vehicle wheel comprising, a pneumatic hub, a series of radially-disposed tubes forming a part of said hub, each inner tube having within the same a cup-shaped plunger, a series of inner rim sections, each rim section having a central recessed portion and upwardly projecting ears, a series of outer rim sections, each section having upwardly extended ends located within said recessed portion of the inner sections, and secured therein by an elongated pivotal connection, and each plunger being pivotally secured to said upward projecting ears, and each outer section secured to each inner section with the central recessed portion of each inner section.

In testimony whereof I affix my signature in presence of two witnesses.

ROBERT H. STEVENSON.

Witnesses:
MAY M. PLYER,
ALFRED B. DENT.